UNITED STATES PATENT OFFICE.

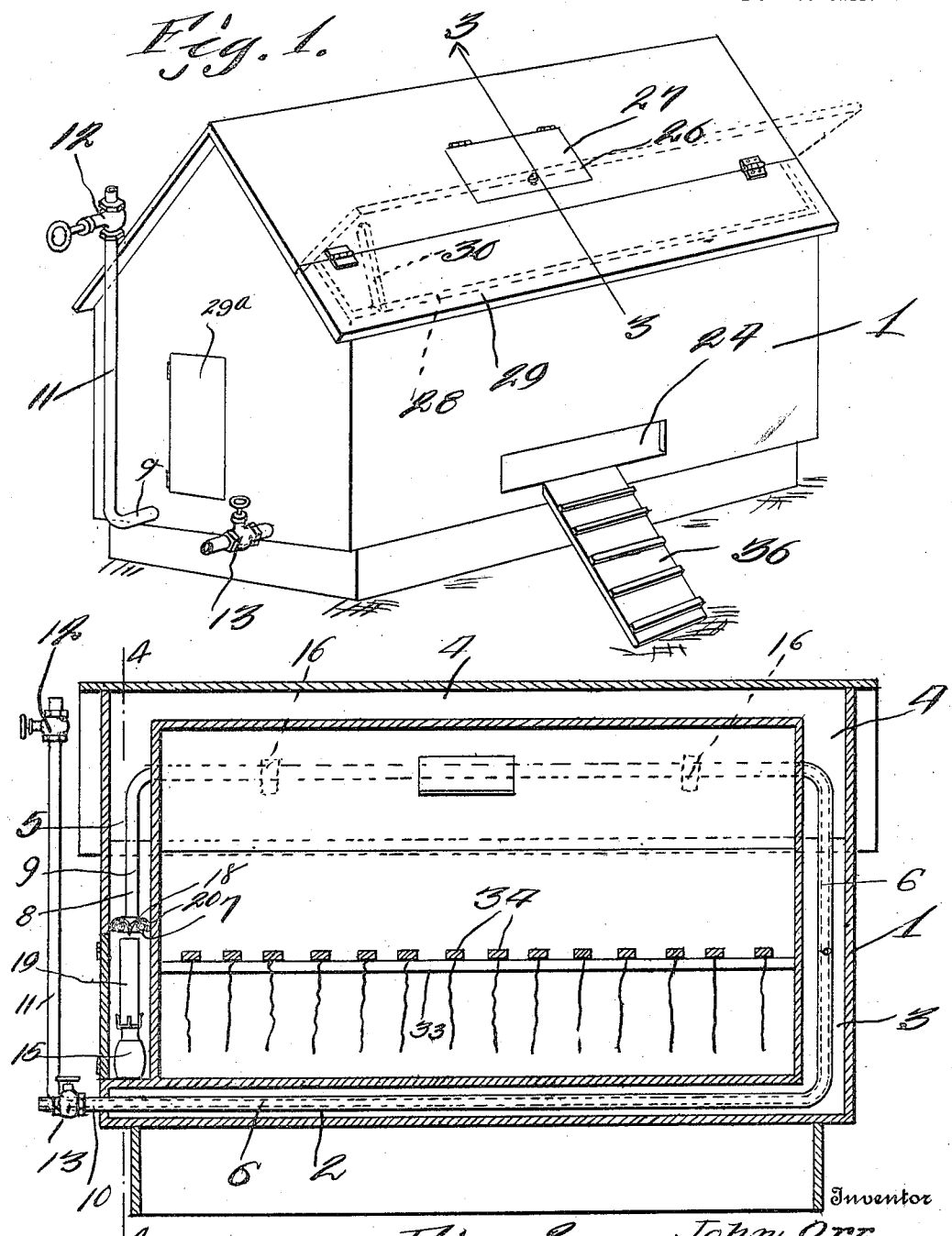

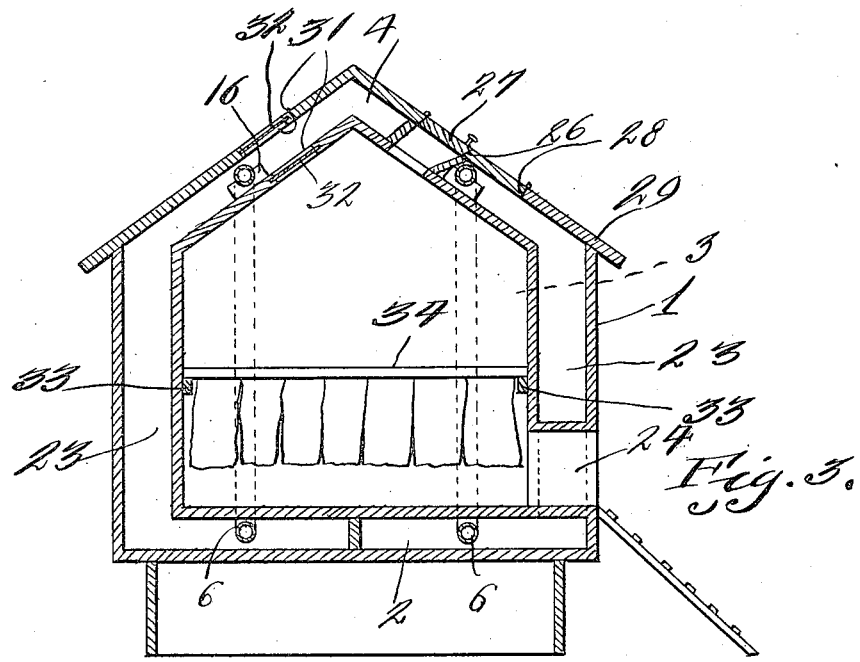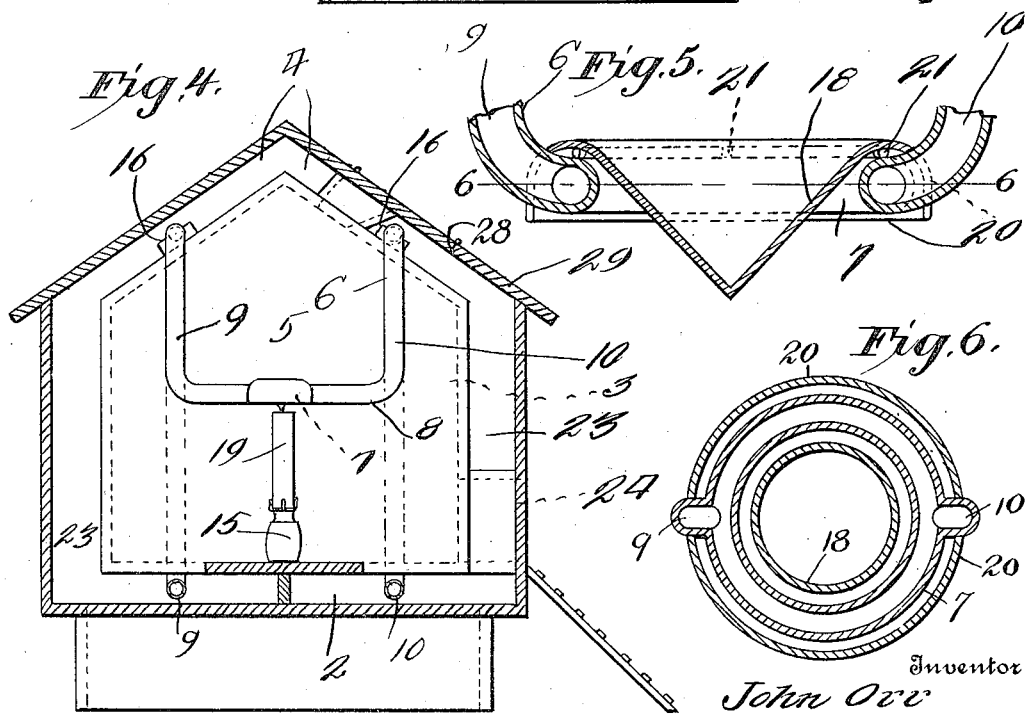

JOHN ORR, OF GREENE, IOWA.

CHICKEN-BROODER.

1,236,102.   Specification of Letters Patent.   Patented Aug. 7, 1917.

Application filed August 16, 1915. Serial No. 45,798.

*To all whom it may concern:*

Be it known that I, JOHN ORR, a citizen of the United States, residing at Greene, in the county of Butler and State of Iowa, have invented a new and useful Chicken-Brooder; and I do hereby declare the following to be a full, clear, and exact description of the invention, such as will enable others skilled in the art to which it appertains to make and use the same.

This invention relates to an improved chicken brooder, and one of the objects of the invention is the provision of a housing having a heating space extending through the bottom, the two ends and through the top through which an air tube adapted to be heated extends, there being a tube at the loop of this air tube, under which a heater is disposed, whereby the air is heated as it passes through the tube.

Another object of the invention is to provide a deflector suspended concentrically on the tube, whereby the heat from the heater is deflected about the tube.

In practical fields the details of construction may necessitate alterations, falling within the scope of what is claimed.

The invention comprises further features and combination of parts, as hereinafter set forth, shown in the drawings and claimed.

In the drawings:—

Figure 1 is a view in perspective of the improved brooder constructed in accordance with the invention.

Fig. 2 is a longitudinal sectional view.

Fig. 3 is a transverse sectional view on line 3—3 of Fig. 1.

Fig. 4 is a transverse sectional view on line 4—4 of Fig. 2 at one end of the brooder.

Fig. 5 is a detail view of the tube and its deflector.

Fig. 6 is a sectional view on line 6—6 of Fig. 5.

Referring more especially to the drawings, 1 designates the housing, which may be of any suitable shape or configuration, and constructed of any suitable material. The housing has a passage or space 2 in its bottom, which merges into the passage 3 at the rear end. The passage 3 or space communicates with the space or passage 4 in the top of the housing, which in turn communicates with the space or passage at the forward or front end. An air tube 6 having a ring-shaped air tube 7 at the loop 8 of the tube 6 is arranged in the passage or space at the forward or front end of the brooder, and the two branches 9 and 10 of this tube extend from the space or passage 5 through the space or passage 4, the space or passage 3, and thence through the space or passage 2 at the bottom of the housing of the brooder. The branch 9 terminates in a right angled upwardly extending portion 11, which opens to the atmosphere, there being a suitable closure or valve 12 to control the outflow of the heated air from the tube. The branch 10 where it terminates at the lower part of the front or forward end of the brooder, is provided with a valve or closure 13, to control the intake of air into the branch 10 of said tube. Disposed immediately below and concentric with the ring-shaped tube in the lower part of the space or passage 5, is a suitable heater or lamp 15, for heating the ring-shaped tube. The branches 9 and 10 of the tube 6 are supported in any suitable manner, as shown at 16. A conical deflector 18 in the form of a casting or stamped or hammered out of a piece of sheet metal, is provided. This deflector has its conical portion extending concentrically through the ring-shaped tube and concentric with the flue 19 from the heater, so that the heat as it leaves the flue is deflected toward and around all sides of the ring-shaped tube, so as to thoroughly heat the same. The conical portion of the deflector merges into an annular curved flange 20, which extends partially about the wall of the ring-shaped tube, there being lugs 21, which not only hold the annular curved flange spaced apart from the wall of the ring-shaped tube, but also hold the deflector concentric with the ring-shaped tube and the heater. The spacing of the annular curved flange, curved in cross section, permits the heat to circulate about and heat the ring-shaped tube. The heat from the heater also circulates through passages or spaces 2, 3, 4 and 5, in order to keep the interior of the brooder warm or the proper temperature for the fowls or chicks.

By means of the deflector 18 the heat from the heater or lamp is concentrated or confined directly against the ring shaped tube 7, thereby heating the air as it circulates through the ring from the tubes 9 and 10. Moreover, the heat is so concentrated or confined on the ring 7 that the ring becomes so intensely heated as to cause the conduction of the heat substantially the full length of the tubes 9 and 10. The radiation of the heat from the ring and from said tubes 9 and 10, is sufficiently intense to keep the passages or spaces 3, 5 and 23 so well heated that the heat will radiate through the interior wall of the brooder and into the interior of the brooder at a proper temperature for the fowls or chickens.

The longitudinal side walls of the brooder are provided with spaces 23, to prevent the exterior atmosphere from penetrating the walls too easily, which would otherwise tend to cool the interior of the brooder. One of the longitudinal side walls is provided with an opening 24 to permit the fowls or the chicks to enter the brooder. The top of the brooder on one side has an opening 26 provided with a closure 27, to permit the escape of excess heat in the brooder. The top of the brooder on the same side with the opening 26 is provided with an opening 28 having a closure 29, whereby the spaces in the walls of the brooder may be ventilated, which closure 29 may be propped open if desired by means of the prop 30. The closure 29 may be propped open at different times, to allow the escape of the products of combustion from the heater or lamp 15. One end of the brooder is provided with a door 29ª, which may be opened to permit air to enter the space or passage 5, as well as the spaces 23, thereby permitting air to be fed to the heater or lamp. The roof of the brooder is provided with registering openings 31, and secured in said openings are pieces of glass 32, whereby light is allowed to enter the brooder.

The interior of the housing or brooder is provided with longitudinal strips or beams 33 having hovering strips 34. The entrance opening 24 is provided with an approach tread 36. The air circulating system, which consists of the branch tubes from the ring shaped tube having their terminals on the exterior of the housing one at a higher altitude than the other, assists in the equalization of temperature throughout the space surrounding the brooder chamber. Furthermore, the heater at the lower part of the space at one end of the brooder chamber establishes a circulation of air throughout the space surrounding the brooder chamber, thereby tending to the equalization of temperature throughout said space. Since the valves at the terminals of the air circulating tubes are arranged at different altitudes (one higher than the other), the lower valve may be adjusted for controlling the circulation of air through said system, and by closing either one of said valves, the circulation of air through the tubes may be discontinued.

The invention having been set forth, what is claimed as new and useful is:—

1. In a brooder, a housing having a continuous space extending through the bottom, the ends thereof and the top, a ring shaped tube in said space at one end of the housing, an air tube bent to form a loop connected to the ring shaped tube, and having its branches extending upwardly through the part of the space having the ring shaped tube and through the space at the top, the other end of the housing and the bottom, said branches terminating on the exterior of the housing, a heater for heating the ring shaped tube, and means for deflecting the heat from the heater toward and about the ring shaped tube.

2. In a brooder, a housing having a continuous space in the bottom, the ends thereof and the top, a ring shaped tube in said space at one end of the housing, branch air tubes extending from diametrically opposite sides of the ring shaped tube, upwardly and through the space in the top, the opposite end and the bottom of the housing, and terminating on the exterior of the housing at the end having said ring shaped tube, said extremities having means for controlling the intake and exhaust of the air.

3. In a brooder, a housing having a continuous space in the bottom, the ends thereof and the top, a ring shaped tube in said space at one end of the housing, branch air tubes extending from diametrically opposite sides of the ring shaped tube, upwardly and through the space in the top, the opposite end and the bottom of the housing, said branch air tubes having their terminals on the exterior of the housing at the end thereof having said ring shaped tube, one of said terminals being arranged at a greater altitude than the other, to insure a circulation of air through said branch tubes, a heater for heating the ring shaped tube, said heater being arranged in said space, whereby the heat therefrom may circulate through the space.

4. In a brooder, a housing having a continuous space extending through the bottom, the ends thereof and the top, a ring shaped tube in said space at one end of the housing and provided with diametrically oppositely disposed branching tubes extending upwardly and through the space in the top, the opposite end and the bottom of the housing, said branch air tubes having their terminals on the exterior of the housing, one of said terminals arranged at a higher altitude than the other, to insure circulation of air through said branch tubes, a heater in said space and located under the ring shaped tube to heat the same, thereby causing a conduction of heat along said branch air tubes, means for deflecting the heat from the heater toward and about the ring shaped tube and cause a circulation of heat through the space, said deflecting means comprising a conical deflector constructed of sheet metal and having an annular flange curved in cross section extending partially about the wall of the ring shaped tube, said deflector having lugs engaging the ring shaped tube for holding the conical deflector concentric with the ring shaped tube and spaced apart therefrom.

5. In a brooder, a housing having a brooder chamber and provided with a continuous space surrounding said chamber, a ring shaped tube in said space at one end of the chamber and having air circulating tubes extending diametrically oppositely therefrom and through said space over the top, the other end and the bottom of the chamber, said air circulating tubes having their terminals on the exterior of the housing, one at a higher altitude than the other to insure a circulation of air through the system, a heater at the lower part of the space at one end of the brooder below the ring shaped tube, whereby heat is furnished thereto and causing a circulation of heat throughout the space, thereby tending to an equalization of temperature throughout the space, and means for deflecting the heat toward and about the ring shaped tube.

In testimony whereof I have signed my name to this specification in the presence of two subscribing witnesses.

JOHN ORR.

Witnesses:
G. R. WATTERSON,
F. L. STOBER.

Copies of this patent may be obtained for five cents each, by addressing the "Commissioner of Patents, Washington, D. C."